Oct. 18, 1932. B. WENGARD 1,883,195
ADVERTISING ATTACHMENT FOR SPARE TIRES
Filed Oct. 31, 1931
Fig. 1.
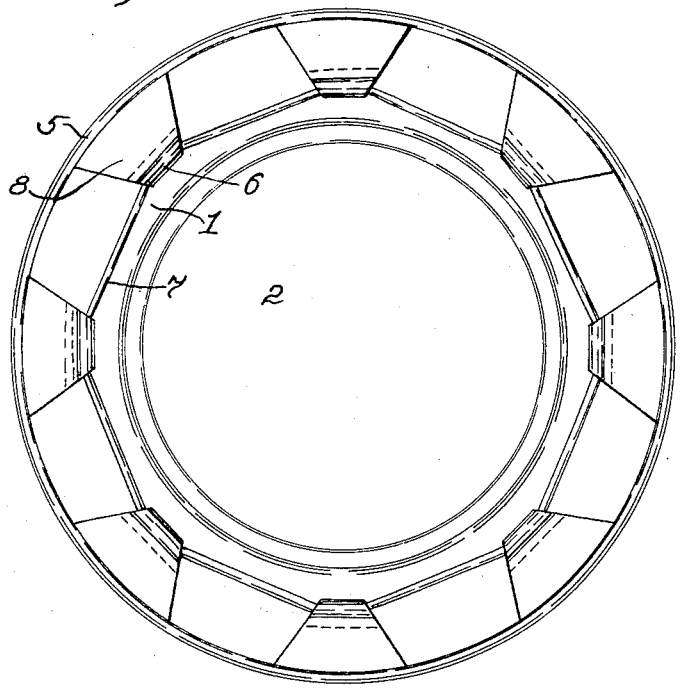
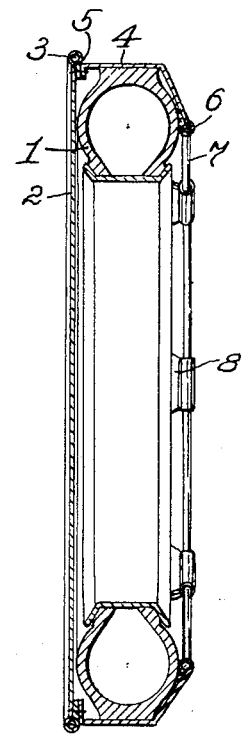
Fig. 2.
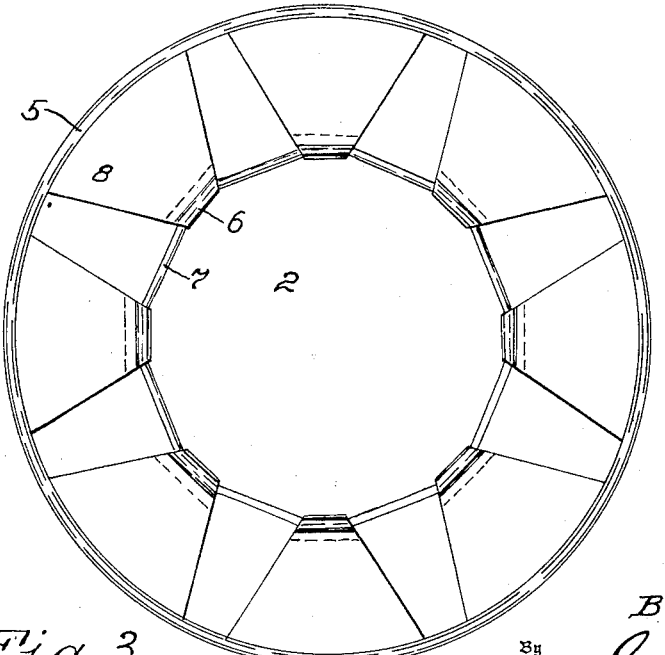
Fig. 3.
Inventor
Ben Wengard,
By G. C. Kennedy,
Attorney Patented Oct. 18, 1932

1,883,195

UNITED STATES PATENT OFFICE

BEN WENGARD, OF WATERLOO, IOWA

ADVERTISING ATTACHMENT FOR SPARE TIRES

Application filed October 31, 1931. Serial No. 572,335.

My invention relates to improvements in display attachments, and the object of my improvement is to supply means for suitably and removably adjustably mounting an advertising or display planar member upon a side face of a spare pneumatic tire.

Another object of my improvements is to furnish means upon and incasing a tire, including elastic tensioning means, which will serve in keeping such a planar display member concentrically upon a tire so as to fit tires of varying diameters and widths of tread, such means being positioned to abut upon the opposite side face of a tire to be invisible from the other side and while keeping the display member when made of flexible material, stretched and smooth at its display surface.

These objects I have attained by the means which are hereinafter described and claimed, and which are illustrated in the accompanying drawing, in which Fig. 1 is a front elevation of a spare pneumatic automobile tire showing my improved attachments thereon for supporting on the opposite side face of the tire tensionally and adjustably such a display member. Fig. 2 is a diametrical transverse section of the combined elements and tire shown in said Fig. 1. Fig. 3 is a similar face presentation of the attaching elements as mounted upon such a display member, but removed from a tire to be substantially in a flat plane as so collapsed.

The numeral 1 denotes a spare pneumatic tire as mounted upon a wheel rim, and 2 denotes a flat member, preferably of oilcloth or the like, flexible, discoidal, and having an inturned annular rim 5 which is stitched annularly to the inturned annular margins of a plurality of like wedge-shaped pieces of annularly spaced cloth or other flexible material 8, the inner truncated and diminished ends of which are inturned and stitched to provide tubular terminations 6 which receive an elastic rubber cord 7 of annular shape, which keeps these tabs or flaps 8 under no or slight centrally acting tension when the device is separated from a tire.

The annular tubular part 5 contains an elastic metal ring 3, unsplit or split, according to whether it is to function on a single size of tire, or for elastic adjustments in spreading apart to evenly circumferentially tension the member 2.

The flat or so-called front face of the display member 2 is that which is directed rearwardly when the spare tire and its said member is mounted upon the rear part of an automobile so as to be plainly visible to a spectator facing it. Upon this front face may be painted or otherwise delineated advertising matter or other display means or objects as desired.

When the present device is mounted upon a tire as shown in said Figs. 1 and 2, the flaps 8 cross the tire tread, and of course afford some covering protection therefor, but their principal function is to evenly distribute the tension derived from the stretched elastic cord 7 around the tire, keeping the device concentrically thereon, especially when the flaps 8 are in oppositely disposed pairs as shown.

The circular ring 3 frames and keeps flat the display member 2, and as stated the flaps 8 are adjustably mounted across the tire tread spreading radially and transversely to fit tires of different sizes.

Having described my invention, what I claim as new, and desire to secure by Letters Patent, is:

1. In combination, a flat display member positioned upon one side face of a pneumatic tire, means engaged with said member peripherally to keep it tensionally extended in a single plane, flexible flaps connected to the circumferential part of said member to cross the tire tread and extend centrally upon the opposite face of the tire, said flaps having elastic connecting means therebetween to retain them and the said display member centrally upon the tire adjustably and under tension.

2. In combination a flat display member having a circumferential head and positioned upon one side face of a pneumatic tire, flexible flaps connected to the circumferential bead of said member, the flaps being carried across the tire tread and then upon its opposite face toward its axis, the flaps having spaced and annularly disposed tubular terminations, an annular elastic cord mounted in said tubular terminations, and an elastic metallic ring incased in the circumferential bead of said member to cooperate with said elastic cord in keeping the display member flatly tensed and concentric with the tire.

3. In combination, a flat display member positioned upon one side face of a pneumatic tire removably, flexible truncated wedge-shaped flaps connected to the circumferential edge of said member, then crossed over the tire tread to be positioned radially upon the opposite face of the tire with their narrower ends inwardly, and tensioning means connected to said narrower ends to exert radial tension upon the flaps around the tire and display member adjustingly.

In testimony whereof I affix my signature.

BEN WENGARD.